(12) United States Patent
Chen et al.

(10) Patent No.: US 8,745,116 B2
(45) Date of Patent: Jun. 3, 2014

(54) LOW-COMPLEXITY INVERSE TRANSFORM COMPUTATION METHOD

(75) Inventors: Oscal Tzyh-Chiang Chen, Chia-Yi (TW); Meng-Lin Hsia, Chia-Yi (TW)

(73) Assignee: National Chung Cheng University, Chia-Yi (TW)

( * ) Notice: Subject to any disclaimer, the term of this patent is extended or adjusted under 35 U.S.C. 154(b) by 534 days.

(21) Appl. No.: 13/116,459

(22) Filed: May 26, 2011

(65) Prior Publication Data
US 2012/0166502 A1    Jun. 28, 2012

(30) Foreign Application Priority Data
Dec. 28, 2010   (TW) ............... 99146430 A

(51) Int. Cl.
*G06F 15/00*    (2006.01)
(52) U.S. Cl.
USPC ....................................................... 708/405
(58) Field of Classification Search
CPC ... G06F 17/141; G06F 17/142; G06F 17/143; G06G 7/1921; G01R 23/00
USPC ....................................................... 708/405
See application file for complete search history.

(56) References Cited

PUBLICATIONS

V. Britanak, P. C. Yip and K. R. Rao, *Discrete Cosine and Sine Transforms*, New York: Academic Press, pp. 1-360, 2007.
T. Wiegand and G. Sullivan, "Draft ITU-T recommendation and final draft international standard of joint video specification (ITU-T Rec. H.264/ISO/IEC 14 496-10 AVC)," *Joint Video Team (JVT) of ISO/IEC MPEG and ITU-T VCEG, JVT-G050*, pp. 1-267, May 2003.
T. Wiegand, G. J. Sullivan, G. Bjontegaard and A. Luthra, "Overview of the H.264/AVC video coding standard," *IEEE Transactions on Circuits and Systems for Video Technology*, vol. 13, No. 7, pp. 560-576, Jul. 2003.
Danian Gong, Yun He and Zhigang Cao, "New cost-effective VLSI implementation of a 2-D discrete cosine transform and its inverse," *IEEE Transactions on Circuits and Systems for Video Technology*, vol. 14, No. 4, pp. 405-415, Apr. 2004.
H.S. Malvar, A. Hallapuro, M. Karczewicz and L. Kerofsky, "Low complexity transform and quantization in H.264/AVC," *IEEE Transactions on Circuits and Systems for Video Technology*, vol. 13, No. 7, pp. 598-603, Jul. 2003.
Guo-An Su and Chih-Peng Fan, "Low-cost hardware-sharing architecture of fast 1-D inverse transforms for H.264/AVC and AVS applications," *IEEE Transactions on Circuits and Systems II: Express Briefs*, vol. 55, No. 12, pp. 1249-1253, Dec. 2008.
Meng-Lin Hsia and Oscal T.-C. Chen, "Low complexity computation of IDCT efficiently adapted to end-of-block points," *Proc. of IASTED International Conference on Signal and Image Processing*, pp. 236-240, Aug. 2009.

(Continued)

*Primary Examiner* — Tan V. Mai
(74) *Attorney, Agent, or Firm* — Muncy, Geissler, Olds & Lowe, P.C.

(57) ABSTRACT

A low-complexity inverse transform computation method, comprising following steps: firstly, analyzing an end-of-block (EOB) point in a matrix of a block; next, determining whether a bottom-left corner coefficient or a top-right coefficient before said EOB point is zero, and if it is zero, reducing further size of said matrix; then, determining an adequate operation mode to reduce computational complexity; and finally, realizing 2-D inverse transform through simplified 1-D inverse transforms. An inverse transform process of said method mentioned above is capable of lowering computation amount, reducing burden and computational complexity of a decompression system, and shortening effectively computation time of said 2-D inverse transform, such that it is applicable to inverse transforms of various video and still image codecs.

9 Claims, 12 Drawing Sheets

(56) References Cited

PUBLICATIONS

C. P. Fan, "Fast 2-dimensional 4×4 forward integer transform implementation for H.264/AVC," *IEEE Transactions on Circuits and Systems II: Express Briefs*, vol. 53, No. 3, pp. 174-177, Mar. 2006.

S. Gordon, D. Marpe and T. Wiegand, "Simplified use of 8×8 transforms—updated proposal and results," *Joint Video Team (JVT) of ISO/IEC MPEG and ITU-T VCEG, JVT-K028*, pp. 1-17, Mar. 2004.

C. P. Fan, "Fast 2-dimensional 8×8 integer transform algorithm design for H.264/AVC fidelity range extensions," *IEICE Transactions on Information and Systems*, vol. E89-D, No. 12, pp. 3006-3011, Dec. 2006.

Meng-Lin Hsia, Oscal T.-C. Chen "Low-Complexity Inverse Integer Transform in H.264/AVC" IEEE, pp. 826-830, Jul. 21, 2010.

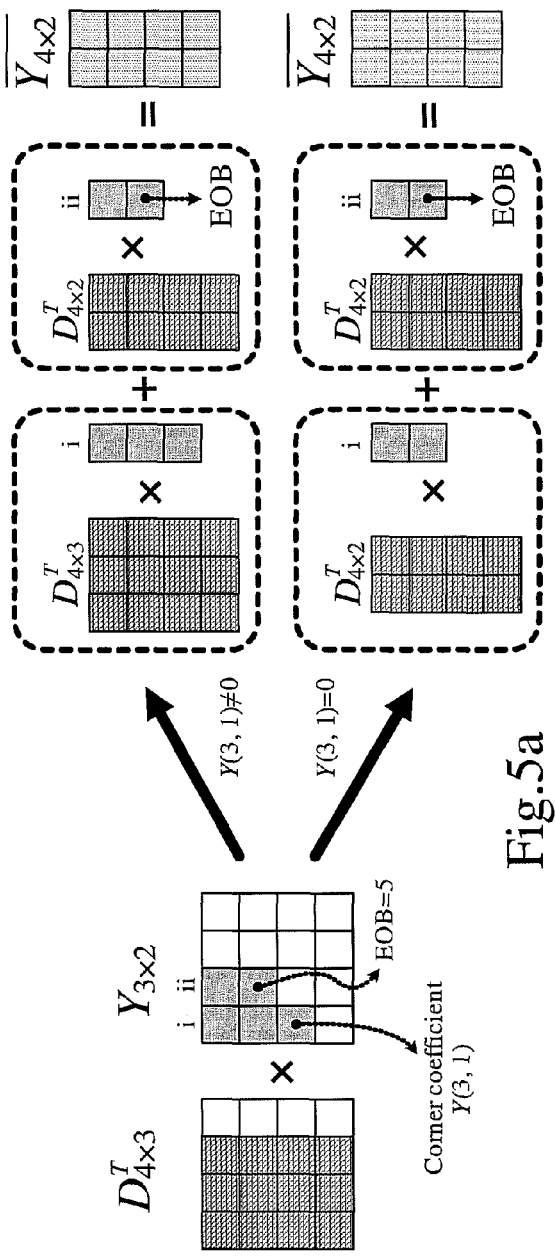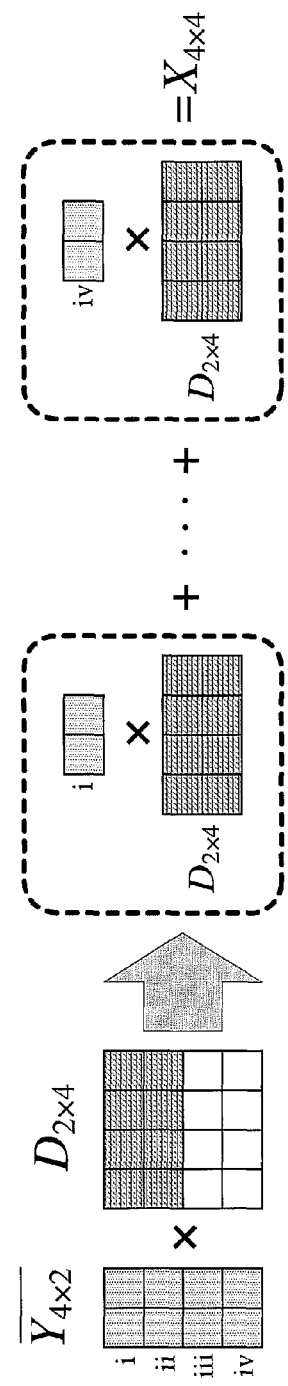
Fig.5a
Fig.5b

LOW-COMPLEXITY INVERSE TRANSFORM COMPUTATION METHOD

BACKGROUND OF THE INVENTION

1. Field of the Invention

The present invention relates to a method of an inverse transform between a spatial domain and a frequency domain, and in particular to a low-complexity inverse transform computation method capable of reducing the enormous computation amount and computation time required in a 2-Dimension (2-D) inverse transform, such that it is applicable to various video decoders.

2. The Prior Arts

With the advent of digital age, most of analog signals are required to be transformed into digital signals in data transmission and processing. However, due to the enormous quantity of data involved, therefore, quite a lot of researches are concentrated on data compression. For example, original multimedia data received by a multimedia device can not be handled and processed efficiently due to the enormous data quantity, limited memory storage capacity and bandwidth of the transmission channel. Therefore, many research institutions explore various multimedia data compression mechanisms, such that the compressed data can be transmitted through a transmission channel efficiently, or memory storage capacity required can be reduced effectively.

Though the compressed data are advantageous to data transmission and storage, yet in application of compressed data, it must be de-compressed and be restored to the original data format. However, decompression of data requires enormous amount of computations. By way of example, in decompression of the compressed video streams, various decoding operations must be performed, such as variable length decoding, de-quantification, inverse transform, and motion compensation. Wherein, the computational complexity of the inverse transform is quite large, and it requires a certain amount of computation time, yet video decompression requires fast and correct decoding, so that many researches have been concentrated on fast inverse transforms, and thereby the video decoder may perform real-time decoding.

In performing video or still image compression, data transformations between a spatial domain and a frequency domain are frequently utilized, such as discrete cosine transform or integer transform, etc., so that image frame data are transformed from the original spatial domain to the frequency domain, and after such a transform, the frequency-domain coefficients are concentrated in the low-frequency region, to be advantageous for the subsequent quantization processing and variable length coding. As to the de-compression process, the frame data are transformed from the original frequency domain to the spatial domain, such as Inverse Discrete Cosine Transform (IDCT) or Inverse Integer Transform (IIT). In these coefficient transforms between a spatial domain and a frequency domain, both coding and decoding require enormous computation amount. In a decoding process where fast speed is essential, the inverse transform process will overburden the decoder. Therefore, quite a lot of researches place their emphases on the fast computation topologies of inverse transforms, so as to reduce computational complexity and computation time. In general, a 2-D inverse transform operation can be expressed as the following equation (1):

$$X_{N \times N} = D_{N \times N}^T \times Y_{N \times N} \times D_{N \times N} \quad (1)$$

wherein, $Y_{N \times N}$ and $X_{N \times N}$ represent respectively frequency-domain coefficients and spatial-domain coefficients. Additionally, $D_{N \times N}^T$ and $D_{N \times N}$ are inverse transform matrices. In the MPEG-2 standard, N=8, and its coefficients of transform matrix are as shown in the following equation (2):

$$D_{8\times 8}^T = \frac{1}{2} \times \begin{bmatrix} \frac{1}{\sqrt{2}} & \cos\frac{\pi}{16} & \cos\frac{\pi}{8} & \cos\frac{3\pi}{16} & \frac{1}{\sqrt{2}} & \sin\frac{3\pi}{16} & \sin\frac{\pi}{8} & \sin\frac{\pi}{16} \\ \frac{1}{\sqrt{2}} & \cos\frac{3\pi}{16} & \sin\frac{\pi}{8} & -\sin\frac{\pi}{16} & -\frac{1}{\sqrt{2}} & -\cos\frac{\pi}{16} & -\cos\frac{\pi}{8} & -\sin\frac{3\pi}{16} \\ \frac{1}{\sqrt{2}} & \sin\frac{3\pi}{16} & -\sin\frac{\pi}{8} & -\cos\frac{\pi}{16} & -\frac{1}{\sqrt{2}} & \sin\frac{\pi}{16} & \cos\frac{\pi}{8} & \cos\frac{3\pi}{16} \\ \frac{1}{\sqrt{2}} & \sin\frac{\pi}{16} & -\cos\frac{\pi}{8} & -\sin\frac{3\pi}{16} & \frac{1}{\sqrt{2}} & \cos\frac{3\pi}{16} & -\sin\frac{\pi}{8} & -\cos\frac{\pi}{16} \\ \frac{1}{\sqrt{2}} & -\sin\frac{\pi}{16} & -\cos\frac{\pi}{8} & \sin\frac{3\pi}{16} & \frac{1}{\sqrt{2}} & -\cos\frac{3\pi}{16} & -\sin\frac{\pi}{8} & \cos\frac{\pi}{16} \\ \frac{1}{\sqrt{2}} & -\sin\frac{3\pi}{16} & -\sin\frac{\pi}{8} & \cos\frac{\pi}{16} & -\frac{1}{\sqrt{2}} & -\sin\frac{\pi}{16} & \cos\frac{\pi}{8} & -\cos\frac{3\pi}{16} \\ \frac{1}{\sqrt{2}} & -\cos\frac{3\pi}{16} & \sin\frac{\pi}{8} & \sin\frac{\pi}{16} & -\frac{1}{\sqrt{2}} & \cos\frac{\pi}{16} & -\cos\frac{\pi}{8} & \sin\frac{3\pi}{16} \\ \frac{1}{\sqrt{2}} & -\cos\frac{\pi}{16} & \cos\frac{\pi}{8} & -\cos\frac{3\pi}{16} & \frac{1}{\sqrt{2}} & -\sin\frac{3\pi}{16} & \sin\frac{\pi}{8} & -\sin\frac{\pi}{16} \end{bmatrix} \quad (2)$$

In H.264/AVC standard, N=4 or 8, and their coefficients of transform matrices are as shown in the following equations (3) and (4):

$$D_{4\times 4}^T = \begin{bmatrix} 1 & 1 & 1 & 1/2 \\ 1 & 1/2 & -1 & -1 \\ 1 & -1/2 & -1 & 1 \\ 1 & -1 & 1 & -1/2 \end{bmatrix} \quad (3)$$

-continued $$D_{8\times 8}^T = \begin{bmatrix} 8 & 12 & 8 & 10 & 8 & 6 & 4 & 3 \\ 8 & 10 & 4 & -3 & -8 & -12 & -8 & -6 \\ 8 & 6 & -4 & -12 & -8 & 3 & 8 & 10 \\ 8 & 3 & -8 & -6 & 8 & 10 & -4 & -12 \\ 8 & -3 & -8 & 6 & 8 & -10 & -4 & 12 \\ 8 & -6 & -4 & 12 & -8 & -3 & 8 & -10 \\ 8 & -10 & 4 & 3 & -8 & 12 & -8 & 6 \\ 8 & -12 & 8 & -10 & 8 & -6 & 4 & -3 \end{bmatrix} \quad (4)$$

FIG. 1a shows a fast computation topology of a 1-D inverse discrete cosine transform proposed by Loeffler et al., wherein, $C_i=\sqrt{2} \cos(i\pi/16)$, $S_i=\sqrt{2} \sin(i\pi/16)$, and $\alpha=\sqrt{2}$. The 1-D inverse discrete cosine transform topology proposed by Loeffler et al. requires 11 multiplications and 29 additions, and this topology is presently the fast computation method utilizing the minimum amount of multiplications. FIGS. 1b and 1c display respectively 4-point and 8-point 1-D inverse integer transform topologies. The conventional 2-D inverse transform requires $N^2$ coefficients, that can be decomposed into row operations of N-point 1-D inverse transform, and column operations of N-point 1-D inverse transform. As depicted in FIGS. 2a and 2b, in a conventional 4×4-point inverse transform, when N=4, a 2-D inverse transform can be decomposed into 4 row operations and 4 column operations, and each operation is a 4-point 1-D inverse transform, so that in a block with a smaller End-Of-Block (EOB) point (namely, the position of the last non-zero coefficient of frequency-domain coefficients), that would require more unnecessary zero-value operations, and such unnecessary computational complexity must be reduced.

Therefore, presently, the performance of inverse transform computation in this respect is not quite satisfactory, and it has much room for improvement.

SUMMARY OF THE INVENTION

In view of the problems and shortcomings of the prior art, the present invention provides a low-complexity inverse transform computation method, so as to overcome the problem and shortcomings of the prior art.

A major objective of the present invention is to provide a low-complexity inverse transform computation method, such that it utilizes information about the EOB point in a block in determining the coefficient distribution in a block, thus reducing the size of matrix and its computational complexity, as well as a high occurrence rate of zero corner coefficients.

Another objective of the present invention is to provide a low-complexity inverse transform computation method that can select a proper operation mode through utilizing the EOB point and determining corner coefficient(s), thus realizing a 2-D inverse transform through simplified 1-D inverse transforms, in achieving reducing computational complexity.

A yet another objective of the present invention is to provide a low-complexity inverse transform computation method, such that it can be applicable to inverse discrete cosine transform, inverse integer transform, inverse discrete Fourier transform, inverse discrete sine transform, or inverse discrete wavelet transform.

To achieve the above-mentioned objective, the present invention provides a low-complexity inverse transform computation method, comprising the following steps: analyzing a block, which forms a matrix composed of a plurality of coefficients, and obtaining an EOB point in the coefficients of the matrix; determining if the corner coefficient(s) before the EOB point is zero, in case that it is zero, then reducing a size of the matrix; determining an operation mode based on the EOB point and corner coefficient(s); and using simplified 1-D inverse transforms in realizing a 2-D inverse transform.

Further scope of the applicability of the present invention will become apparent from the detailed description given hereinafter. However, it should be understood that the detailed description and specific examples, while indicating preferred embodiments of the present invention, are given by way of illustration only, since various changes and modifications within the spirit and scope of the present invention will become apparent to those skilled in the art from this detailed description.

BRIEF DESCRIPTION OF THE DRAWINGS

The related drawings in connection with the detailed description of the present invention to be made later are described briefly as follows, in which:

FIGS. 1a to 1c are block diagrams respectively of 1-D inverse transform topologies of the prior art, wherein FIG. 1a is a topology of an 8-point inverse discrete cosine transform, FIG. 1b is a topology of a 4-point inverse integer transform, and FIG. 1c is a topology of an 8-point inverse integer transform;

Figures 2A, 2B:
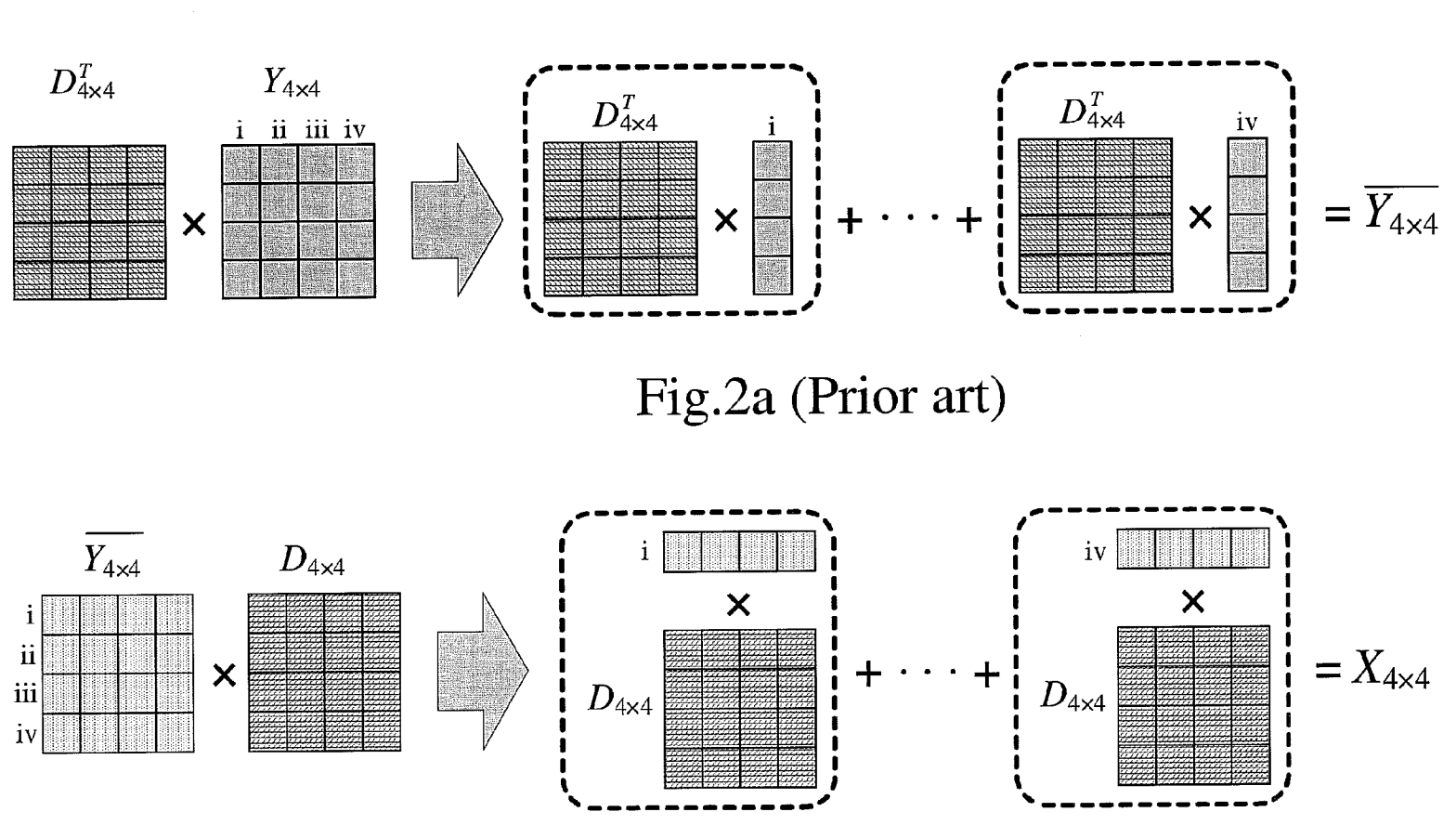

FIG. 2a is a schematic diagram of column operations of a 4×4-point inverse transform of the prior art;

FIG. 2b is a schematic diagram of row operations of a 4×4-point inverse transform of the prior art;

FIG. 5a is a schematic diagram of column operations of a 4×4-point inverse transform for an EOB point of 5 according to the present invention;

FIG. 5b is a schematic diagram of row operations of a 4×4-point inverse transform for an EOB point of 5 according to the present invention;

FIGS. 8a to 8c are schematic diagrams respectively for simplified 1-D inverse transform topologies according to the present invention, wherein, FIG. 8a shows a topology of a 1-D inverse discrete cosine transform with five inputs and eight outputs, FIG. 8b shows a topology of a 1-D inverse integer transform with two inputs and four outputs, and FIG. 8c shows a topology of a 1-D inverse integer transform with three inputs and eight outputs.

DETAILED DESCRIPTION OF THE PREFERRED EMBODIMENT

The purpose, construction, features, functions and advantages of the present invention can be appreciated and understood more thoroughly through the following detailed description with reference to the attached drawings.

The present invention provides a low-complexity inverse transform computation method, thus to the complicated process flow of an inverse transform between a frequency domain and a spatial domain; it proposes a low-complexity computation process flow, so as to reduce the enormous computation amount and computation time required for a 2-D inverse transform, such that it can be applicable to a video decoder.

Figure 3:
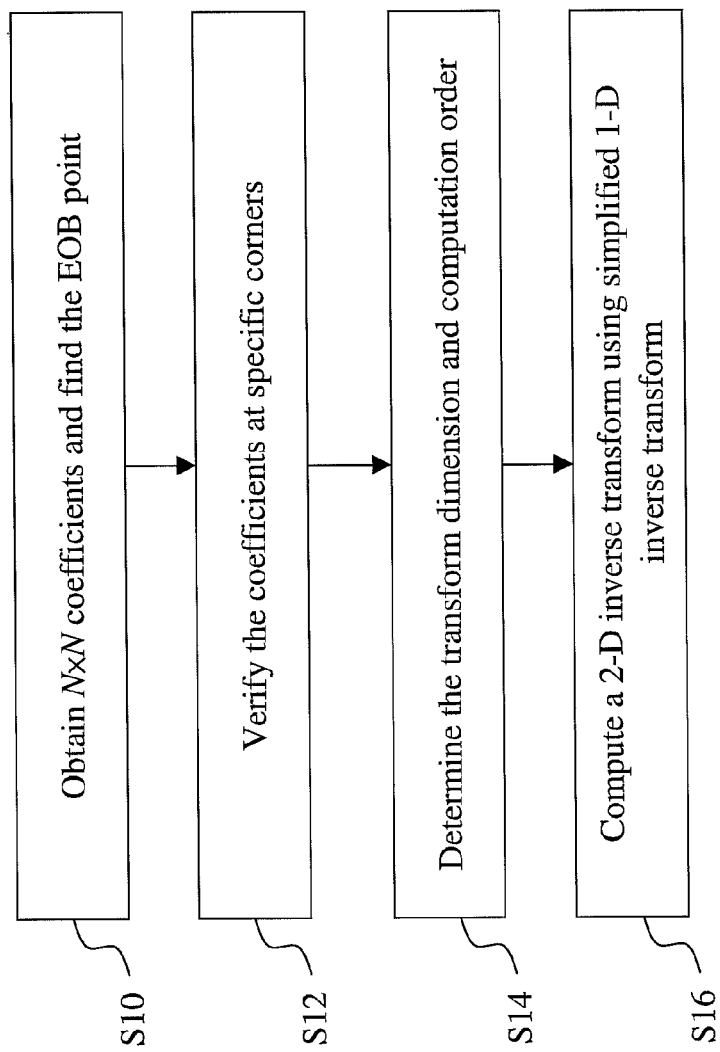
FIG. 3 is a flowchart of the steps of a low-complexity inverse transform computation method according to the present invention.

Refer to FIG. 3 for a flowchart of the steps of a low-complexity inverse transform computation method according to the present invention. As shown in FIG. 3, firstly, in step S10, determining the EOB point in a block, said block forms a matrix including a plurality of coefficients, such that the EOB point in a matrix represents the position of the last non-zero coefficient of the frequency-domain coefficients in a zigzag scan, in case that the coefficient computations after the EOB point can be eliminated, then the computational complexity and time required can be drastically reduced. In video and image decompression, the information associated with the EOB point in a block sometimes is included in the bit stream, such as in the MPEG-2 standard. However, in some of video standards, the information associated with the EOB point is not included in the bit stream, such as in the H.264/AVC standard. In this circumstance, the application of the method of the present invention would require computation of other parameters to derive information about the EOB point, and this computation process would require additional computation cost depending on various different video standards.

Figure 4:
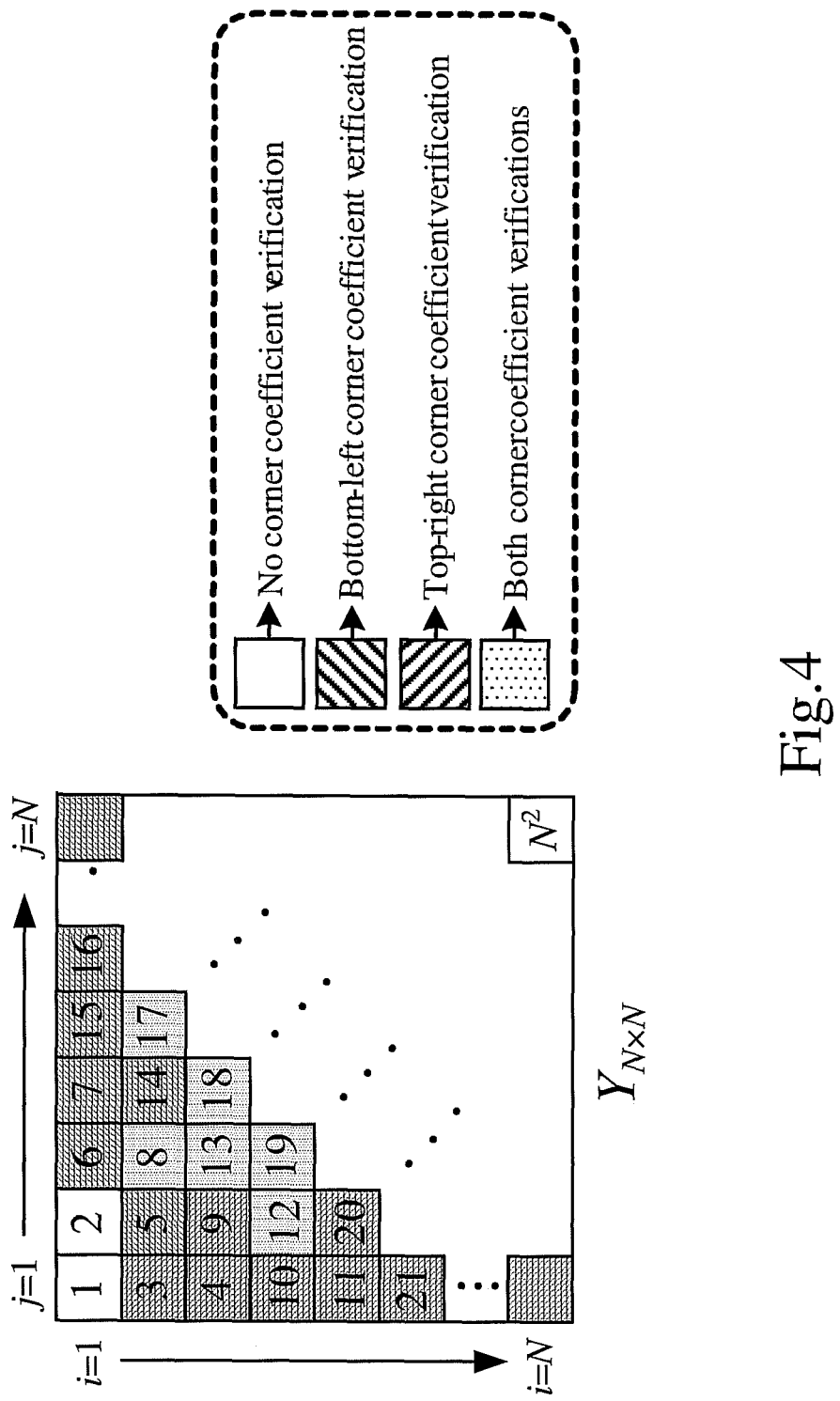
FIG. 4 is a schematic diagram showing ways of determining corner coefficients according to an embodiment of the present invention.

Next, as shown in step S12, determining if the corner coefficient before the EOB point is zero, in case the answer is positive, then reducing the size of the matrix. In a zigzag scan, in addition to the coefficients after the EOB point are zeroes, the zero-value coefficients could occur in the bottom-left corner and top-right corner before the EOB point. For the bottom-left corner, the zero-value coefficient could affect the operation range in a column direction (horizontal direction), and for the top-right corner, the zero-value coefficient could affect the operation range in a row direction (vertical direction). When the corner coefficients are zeros, the number of operations for rows or columns in a matrix can be lowered to reduce the computational complexity, and the price for this reduction is only two comparison operations at most. Meanwhile, refer to FIG. 4 for a schematic diagram showing ways of determining corner coefficients according to an embodiment of the present invention. As shown in FIG. 4, the number in the drawing indicates the value of the EOB point in a zigzag scan. Wherein, the determination mechanism can be classified into the following four categories: (1) not required to determine the corner coefficient, (2) only required to determine the coefficient at the bottom-left corner, (3) only required to determine the coefficient at the top-right corner, and (4) required to determine coefficients at both the bottom-left and top-right corners.

In a block of $Y_{N \times N}$, when the EOB point is less than 3 or greater than $N^2/2+3N/2-2$, there is no need to determine the corner coefficient, since if the EOB point is less than 3, there is no corner coefficient, and if the EOB point is greater than $N^2/2+3N/2-2$, there are too many coefficients to be verified, thus the determination process would add too much computational complexity. Conversely, in case that the EOB point is between 3 and $N^2/2+3N/2-2$, then determining the corner coefficient, such that if its value is zero, computational complexity of the 2-D inverse transform can be reduced.

Subsequently, as shown in step S14, determining the operation mode, wherein, the adequate operation mode is determined based on the EOB point and the corner coefficient(s). The operation mode includes matrix dimension [a, b] and computation order, wherein, the minimum matrix dimension [a, b] is [1, 1], and the maximum matrix dimension [a, b] is [N, N]; while the computation order can be classified as a row-after-column manner or a column-after-row manner. In this way, applying the adequate operation mode on a 2-D inverse transform to yield the minimum computational complexity, so that the equation (1) can be rearranged as the following equation (5):

$$X_{N \times N} = \begin{cases} D_{N \times a'}^T \times Y_{a' \times b'} \times D_{b' \times N}, & \text{before corner verification} \\ D_{N \times a}^T \times Y_{a \times b} \times D_{b \times N}, & \text{after corner verification} \end{cases} \quad (5)$$

wherein $Y_{a' \times b'}$ indicates the simplified matrix after taking into consideration of the EOB point, and $Y_{a \times b}$ indicates the simplified matrix after taking into consideration of the EOB point and corner coefficient. The range of a', b', a and b is between 1 and N. From equation (5), it can be known that, the values of coefficients outside range [a, b] are zero, and thus not requiring any operation, such that the computational complexity of the 2-D inverse transform can be reduced.

When the EOB point is between 3 and $N^2/2+3N/2-2$, the method of the present invention will determine if the corner coefficient is zero, and the computation order of the 2-D inverse transform can be determined through values of a', b', a and b. When a is less than b, execute $Y_{a \times b} \times D_{b \times N}$ first, or if a is greater than b, then execute $D_{N \times a}^T \times Y_{a \times b}$ first. When a is equal to b, determine if a' is less than b', and if the answer is positive, execute $Y_{a \times b} \times D_{b \times N}$ first; and when a' is greater than b', execute $D_{N \times a}^T \times Y_{a \times b}$ first, and if a' is equal to b', then the computation order of $Y_{a \times b} \times D_{b \times N}$ or $D_{N \times a}^T \times Y_{a \times b}$ will not affect the computational complexity of a 2-D inverse transform. The description mentioned above can be expressed in the equation (6) as follows:

$$X_{N \times N} = \begin{cases} D_{N \times a}^T \times (Y_{a \times b} \times D_{b \times N}) & \text{for } (a < b) \text{ or } (a = b \text{ and } a' < b') \\ (D_{N \times a}^T \times Y_{a \times b}) \times D_{b \times N} & \text{for } (a > b) \text{ or } (a = b \text{ and } a' > b') \\ D_{N \times a}^T \times Y_{a \times b} \times D_{b \times N} & \text{for } a = b \text{ and } a' = b' \end{cases} \quad (6)$$

Through the method described above, the minimum operation dimension [a, b] and the adequate computation order can be obtained to get the minimum computational complexity. When the EOB point is over $N^2/2+3N/2-2$, the values of a', b', a and b are all N, thus the computation order of an 2-D inverse transform can not be obtained through equation (6), and it must be determined through the computational complexity of 1-D inverse transforms in cooperation with the matrix operation required.

Finally, as shown in step S16, perform the 1-D and 2-D inverse transforms as required. In order to reduce computational complexity, the present invention simplifies adequately an N-point 1-D inverse transform into a transform having i inputs and N outputs, wherein, the range of i is from 1 to N. In this way, a 2-D inverse transform with minimized computational complexity can be obtained through simplified 1-D inverse transforms in cooperation with determination of the EOB point, corner coefficients, and the optimized operation mode. For example, refer to FIGS. 5a and 5b for schematic diagrams of row and column operations of a 4×4-point inverse transforms for an EOB point of 5 respectively according to the present invention. As shown in FIGS. 5a and 5b, when the EOB point is 5, for the matrix dimension, only the gray area in $Y_{3 \times 2}$ has to be considered; in case that the corner coefficient $Y(3,1)$ is not zero, then the first column and second column of $Y_{3 \times 2}$ are multiplied with $D_{4 \times 3}^T$ and $D_{4 \times 2}^T$ respectively; or in case that the corner coefficient Y(3,1) is zero, then the first column and second column of $Y_{3\times 2}$ are both multiplied with $D_{4\times 2}^T$. In this way, the method of the present invention can effectively eliminate computation of zero-value corner coefficients and thus reduce computational complexity, and this method is also applicable to a 2-D inverse transform at N=8.

In the following, an embodiment is described for applying the four steps mentioned above into the MPEG-2 and H.264 video coding standards. In the MPEG-2 standard, the information about an EOB point in a block is contained in a bit stream, thus no additional computation cost is required to obtain an EOB point. However, in the H.264/AVC standard, there is no parameter that can directly indicate an EOB point. The H.264/AVC standard includes two kinds of entropy coding mechanisms: the Context-based Adaptive Binary Arithmetic Coding (CABAC), and the Context-Adaptive Variable Length Coding (CAVLC), respectively. In the CABAC, no relevant parameters can be used to derive EOB points in a simple way; while in CAVLC, two relevant parameters TotalCoeff and total_zeros can be used to derive the EOB point. Wherein, TotalCoeff represents the total number of non-zero coefficients in a $Y_{4\times 4}$ block, while total_zeros represents the total number of zero-value coefficients before the last non-zero coefficient, then combining the two in obtaining the EOB point of a $Y_{4\times 4}$ block, as depicted in the following equation (7):

$$EOB_{4\times 4} = TotalCoeff + total\_zeros \quad (7)$$

In this operation, the additional computation cost required is an addition operation.

Figure 6:
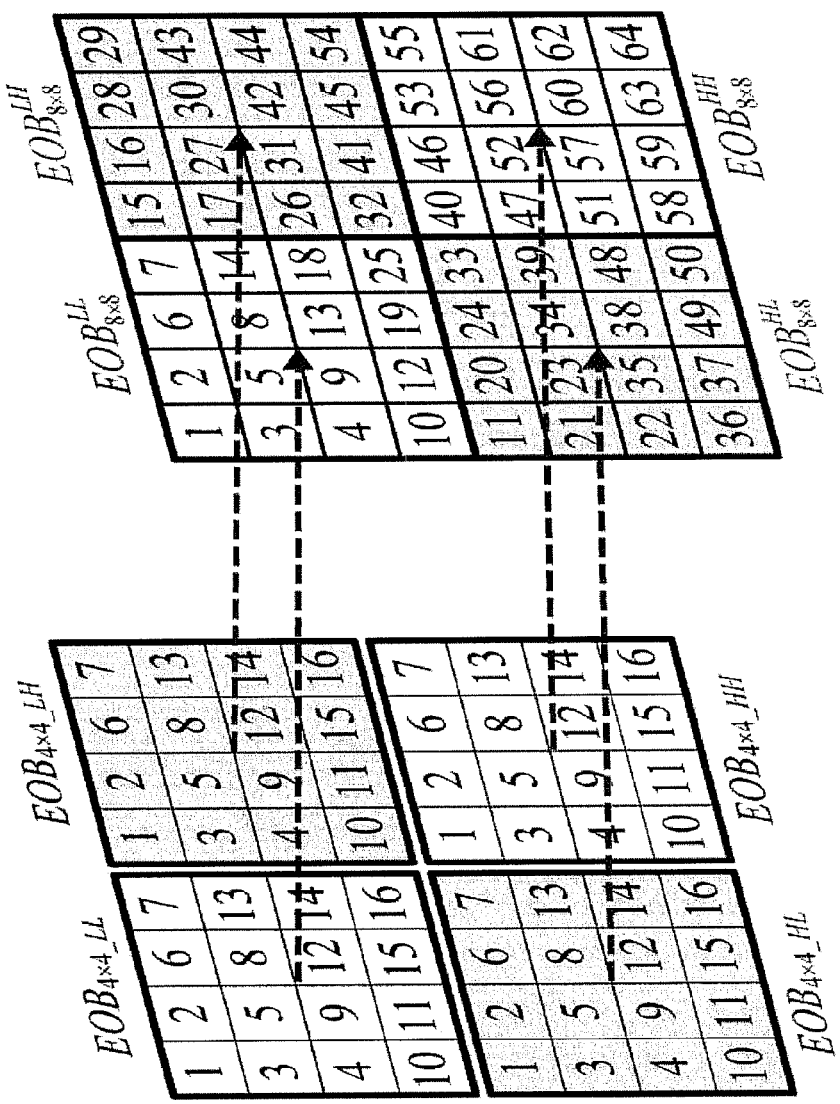
FIG. 6 is a schematic diagram showing the corresponding relations of EOB points between four 4×4 blocks and an 8×8 block according to the present invention.

In the H.264/AVC standard, CAVLC is only suitable for a 4×4 block. Therefore, in order to obtain the EOB point of a $Y_{8\times 8}$ block, it has to be derived through EOB points of four 4×4 blocks in a $Y_{8\times 8}$ block, and this process involves a table lookup mechanism and a comparison operation. The table lookup mechanism involves connecting the EOB points of four 4×4 blocks to the EOB candidate points of the corresponding $Y_{8\times 8}$ block, as shown in FIG. 6. From FIG. 6, it can be known that $EOB_{4\times 4\_LL}$, $EOB_{4\times 4\_LH}$, $EOB_{4\times 4\_HL}$ and $EOB_{4\times 4\_HH}$ represent the EOB points of the four 4×4 blocks respectively, and $EOB_{8\times 8}^{LL}$, $EOB_{8\times 8}^{LH}$, $EOB_{8\times 8}^{HL}$ and $EOB_{8\times 8}^{HH}$ are the corresponding EOB candidate points in a $Y_{8\times 8}$ block. Wherein, the numbers indicate the sequence in the zigzag scan, such that in case $EOB_{4\times 4\_LL}$ is zero, then $EOB_{8\times 8}^{LL}$ is also zero, and the rest of EOB point values can be inferred in the same way.

The comparison operation is to make comparisons among non-zero $EOB_{8\times 8}^{LL}$, $EOB_{8\times 8}^{LH}$, $EOB_{8\times 8}^{HL}$ 與 $EOB_{8\times 8}^{HH}$, and select the maximum value as $EOB_{8\times 8}$. From the zigzag scan sequence of an 8×8 block, it can be known that, if $EOB_{8\times 8}^{HH}$ is not zero, then $EOB_{8\times 8}$ is the maximum value of $EOB_{8\times 8}^{LH}$, $EOB_{8\times 8}^{HL}$, and $EOB_{8\times 8}^{HH}$ without the need to consider $EOB_{8\times 8}^{LL}$, that is because $EOB_{8\times 8}^{HH}$ must be larger than $EOB_{8\times 8}^{LL}$. On the contrary, if $EOB_{8\times 8}^{HH}$ is zero, then $EOB_{8\times 8}$ is the maximum value of $EOB_{8\times 8}^{LL}$, $EOB_{8\times 8}^{LH}$, and $EOB_{8\times 8}^{HL}$. In other words, it only needs to compare ($EOB_{8\times 8}^{LL}$, $EOB_{8\times 8}^{LH}$, and $EOB_{8\times 8}^{HL}$) or ($EOB_{8\times 8}^{LH}$, $EOB_{8\times 8}^{HL}$, and $EOB_{8\times 8}^{HH}$), so as to select the maximum as $EOB_{8\times 8}$. The above comparisons can be expressed as the equation (8) below:

$$EOB_{8\times 8} = \begin{cases} \max(EOB_{8\times 8}^{LH}, EOB_{8\times 8}^{HL} \text{ and } EOB_{8\times 8}^{HH}), & EOB_{8\times 8}^{HH} \neq 0 \\ \max(EOB_{8\times 8}^{LL}, EOB_{8\times 8}^{LH} \text{ and } EOB_{8\times 8}^{HL}), & EOB_{8\times 8}^{HH} = 0 \end{cases} \quad (8)$$

Figure 7A:
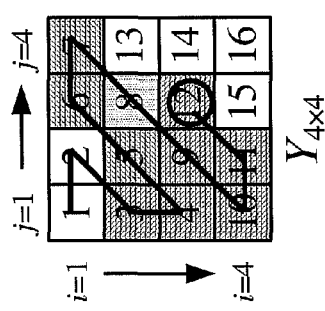
FIGS. 7a and 7b are schematic diagrams showing ways of determining corner coefficients of a 4×4 block and an 8×8 block respectively according to an embodiment of the present invention.
Figure 7B:
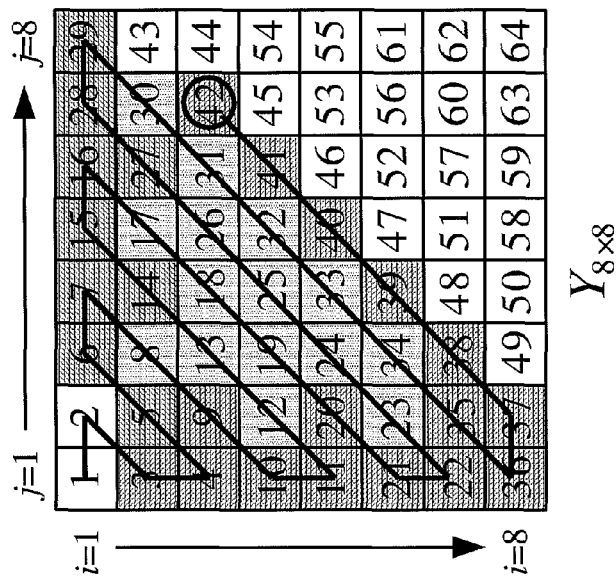

The additional computation cost required is four additions, three comparisons, and three table look-ups. Refer to FIGS. 7a and 7b for schematic diagrams showing ways of determining corner coefficients of a 4×4 block and an 8×8 block for N=4 and N=8 respectively according to the present invention. As shown in FIGS. 7a and 7b, the numbers in the drawing indicate the values of EOB points in a zigzag scan, wherein, the determination mechanism can be classified into the following four categories: (1) not required to determine corner coefficients, (2) only required to determine the coefficient at the bottom-left corner, (3) only required to determine the coefficient at the top-right corner, and (4) required to determine coefficients at both the bottom-left and top-right corners. As mentioned above, in a block of $Y_{N\times N}$, when the EOB point is less than 3 or greater than $N^2/2+3N/2-2$, there is no need to determine the corner coefficient. On the contrary, in case that the EOB point is between 3 and $N^2/2+3N/2-2$, then determine the corner coefficient. For example, when N=4, there is no need to determine the corner coefficient for EOB points of 1, 2, 13-16, it is only required to determine the bottom-left corner coefficient for EOB points of 5-7, and it is only required to determine the top-right corner coefficient for EOB points of 3, 4, 9-12, and it is required to determine both bottom-left and top-right corner coefficients for the EOB point of 8, as displayed in FIG. 7a.

Then, determining the operation mode, when N=4 and the EOB point is 5, in case that $Y_{a\times b} \times D_{b\times N}$ is executed first, then it requires a 1-D inverse transform with two inputs and four outputs, and a 1-D inverse transform with one input and four outputs; in case that $D_{N\times a}^T \times Y_{a\times b}$ is executed first, then it requires a 1-D inverse transform with three inputs and four outputs, and a 1-D inverse transform with two inputs and four outputs. These two kinds of computation orders could result in different computational complexity. Therefore, the selection of adequate computation order could affect the computational complexity significantly. In Table 1 below shows the corner coefficient position and adequate operation mode for N=4, RAC represents row-after-column operation, and CAR represents column-after-row operation, and this is applicable to a 4×4-point inverse integer transform in the H.264/AVC standard.

TABLE 1

Operation modes for N = 4.

| EOB | Corner Coeff. position Y(i, j) | Operation modes ([a, b] of $Y_{a\times b}$ & computation order) | Operation no. S | A |
|---|---|---|---|---|
| 1 | — | [1, 1] & CAR or RAC | 0 | 0 |
| 2 | — | [1, 2] & CAR | 1 | 4 |
| 3 | Y(1, 2) | [2, 2] & CAR or RAC, at Y(1, 2) ≠ 0 | 5 | 20 |
|   |   | [2, 1] & RAC, at Y(1, 2) = 0 | 1 | 4 |
| 4 | Y(1, 2) | [3, 2] & RAC, at Y(1, 2) ≠ 0 | 5 | 22 |
|   |   | [3, 1] & RAC, at Y(1, 2) = 0 | 1 | 6 |
| 5 | Y(3, 1) | [3, 2] & RAC, at Y(3, 1) ≠ 0 | 6 | 26 |
|   |   | [2, 2] & RAC, at Y(3, 1) = 0 | 6 | 24 |
| 6 | Y(3, 1) | [3, 3] & CAR or RAC, at Y(3, 1) ≠ 0 | 6 | 34 |
|   |   | [2, 3] & CAR, at Y(3, 1) = 0 | 6 | 26 |
| 7 | Y(3, 1) | [3, 4] & CAR, at Y(3, 1) ≠ 0 | 7 | 36 |
|   |   | [2, 4] & CAR, at Y(3, 1) = 0 | 7 | 28 |

TABLE 1-continued

Operation modes for N = 4.

| EOB | Corner Coeff. position Y(i, j) | Operation modes ([a, b] of $Y_{a \times b}$ & computation order) | Operation no. S | A |
|---|---|---|---|---|
| 8 | Y(3, 1) & Y(1, 4) | [3, 4] & CAR, at Y(3, 1) ≠ 0 and Y(1, 4) ≠ 0 | 7 | 38 |
|  |  | [2, 4] & CAR, at Y(3, 1) = 0 and Y(1, 4) ≠ 0 | 7 | 30 |
|  |  | [3, 3] & CAR, at Y(3, 1) ≠ 0 and Y(1, 4) = 0 | 6 | 36 |
|  |  | [2, 3] & CAR, at Y(3, 1) = Y(1, 4) = 0 | 6 | 28 |
| 9 | Y(1, 4) | [3, 4] & CAR, at Y(1, 4) ≠ 0 | 8 | 42 |
|  |  | [3, 3] & CAR, at Y(1, 4) = 0 | 7 | 40 |
| 10 | Y(1, 4) | [4, 4] & CAR or RAC, at Y(1, 4) ≠ 0 | 12 | 50 |
|  |  | [4, 3] & RAC, at Y(1, 4) = 0 | 8 | 42 |
| 11 | Y(1, 4) | [4, 4] & RAC, at Y(1, 4) ≠ 0 | 13 | 52 |
|  |  | [4, 3] & RAC, at Y(1, 4) = 0 | 9 | 44 |
| 12 | Y(1, 4) | [4, 4] & RAC, at Y(1, 4) ≠ 0 | 13 | 54 |
|  |  | [4, 3] & RAC, at Y(1, 4) = 0 | 9 | 46 |
| 13 | — | [4, 4] & CAR or RAC | 14 | 58 |
| 14 | — | [4, 4] & RAC | 14 | 60 |
| 15 | — | [4, 4] & CAR or RAC | 15 | 62 |
| 16 | — | [4, 4] & CAR or RAC | 16 | 64 |

Figure 1A:
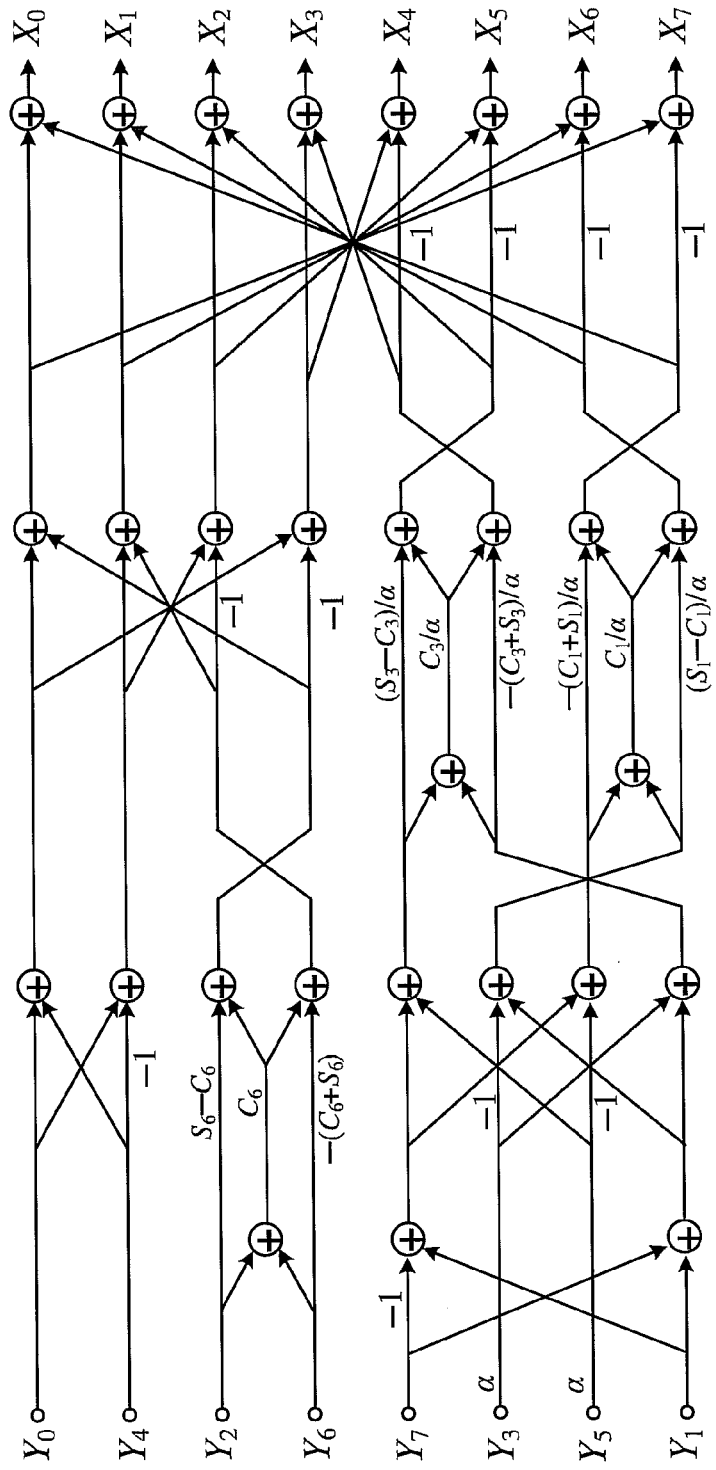
Figure 8A:
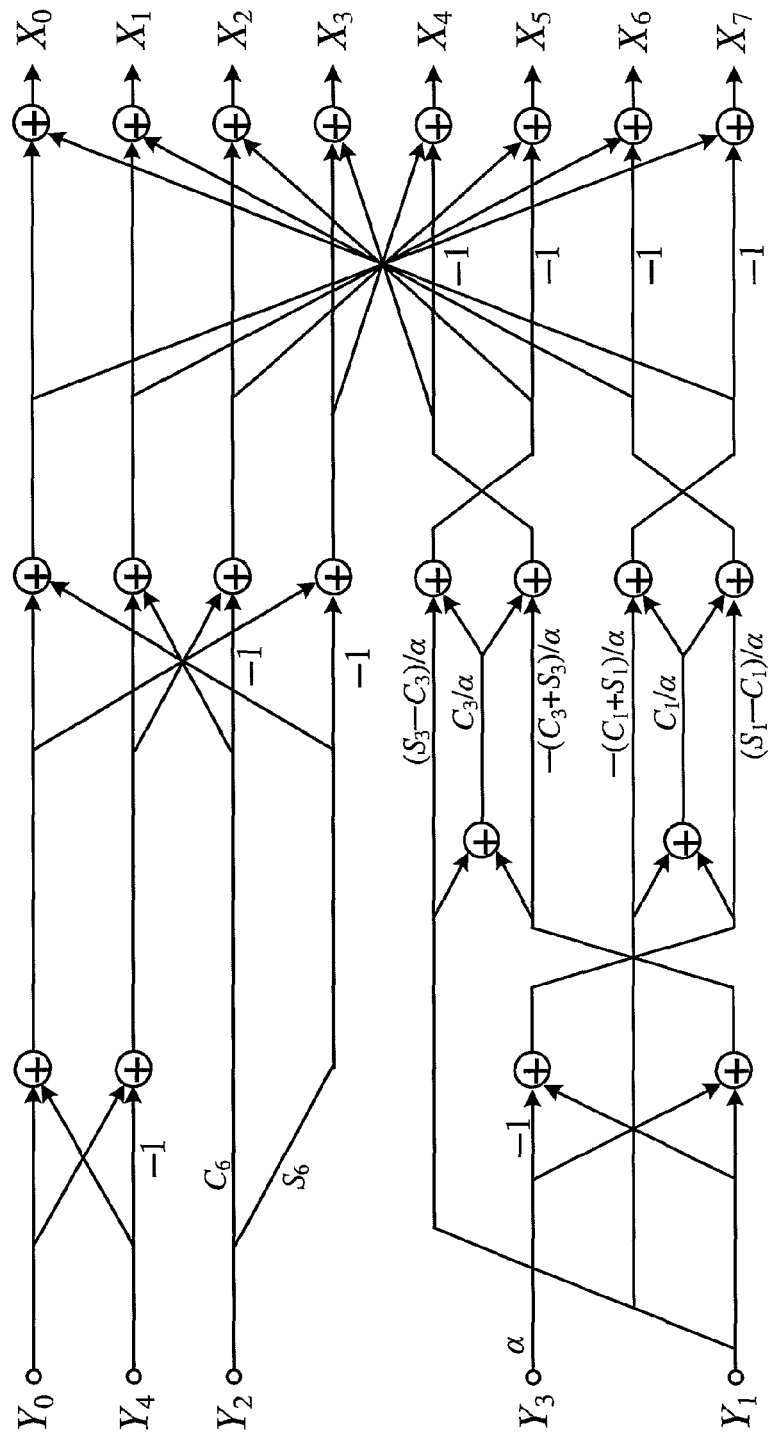

Finally, perform a 2-D inverse transform based on 1-D inverse transforms, in order to reduce computational complexity where the 1-D inverse transform in FIG. 1 can be simplified further into a 1-D inverse transform with i inputs and N outputs, with the range of i being from 1 to N. FIG. 8a shows a 1-D inverse discrete cosine transform topology having 5 inputs and 8 outputs requiring only 9 multiplications and 22 additions, and its computational complexity is reduced significantly as compared with the 1-D inverse discrete cosine transform having 8 inputs and 8 outputs requiring 11 multiplications and 29 additions as shown in FIG. 1a. In the following, Table 2 lists the computational complexity associated with simplified 1-D inverse discrete cosine transforms for i from 1 to 8, wherein M and A represent the numbers of multiplication and addition operations, respectively.

TABLE 2

Computational complexity associated with 1-D inverse discrete cosine transforms with i inputs and 8 outputs

| Number of inputs (i) | 1 | 2 | 3 | 4 | 5 | 6 | 7 | 8 |
|---|---|---|---|---|---|---|---|---|
| Number of multiplication operations (M) | 0 | 4 | 6 | 9 | 9 | 10 | 11 | 11 |
| Number of addition operations (A) | 0 | 8 | 12 | 20 | 22 | 24 | 27 | 29 |
| Number of total operations (M + A) | 0 | 12 | 18 | 29 | 31 | 34 | 38 | 40 |

Figure 1B:
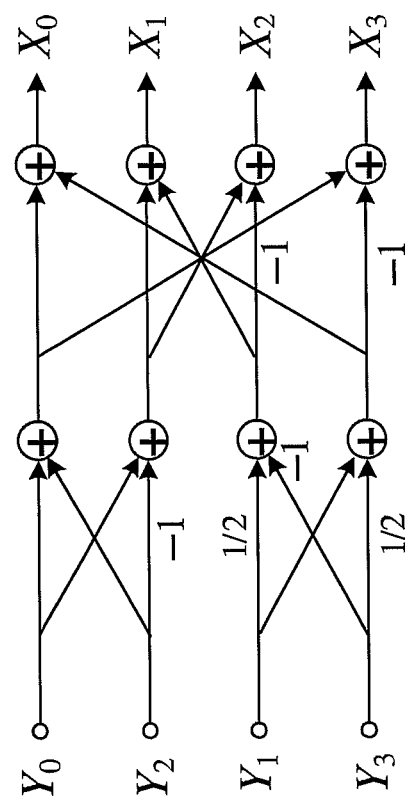
Figure 1C:
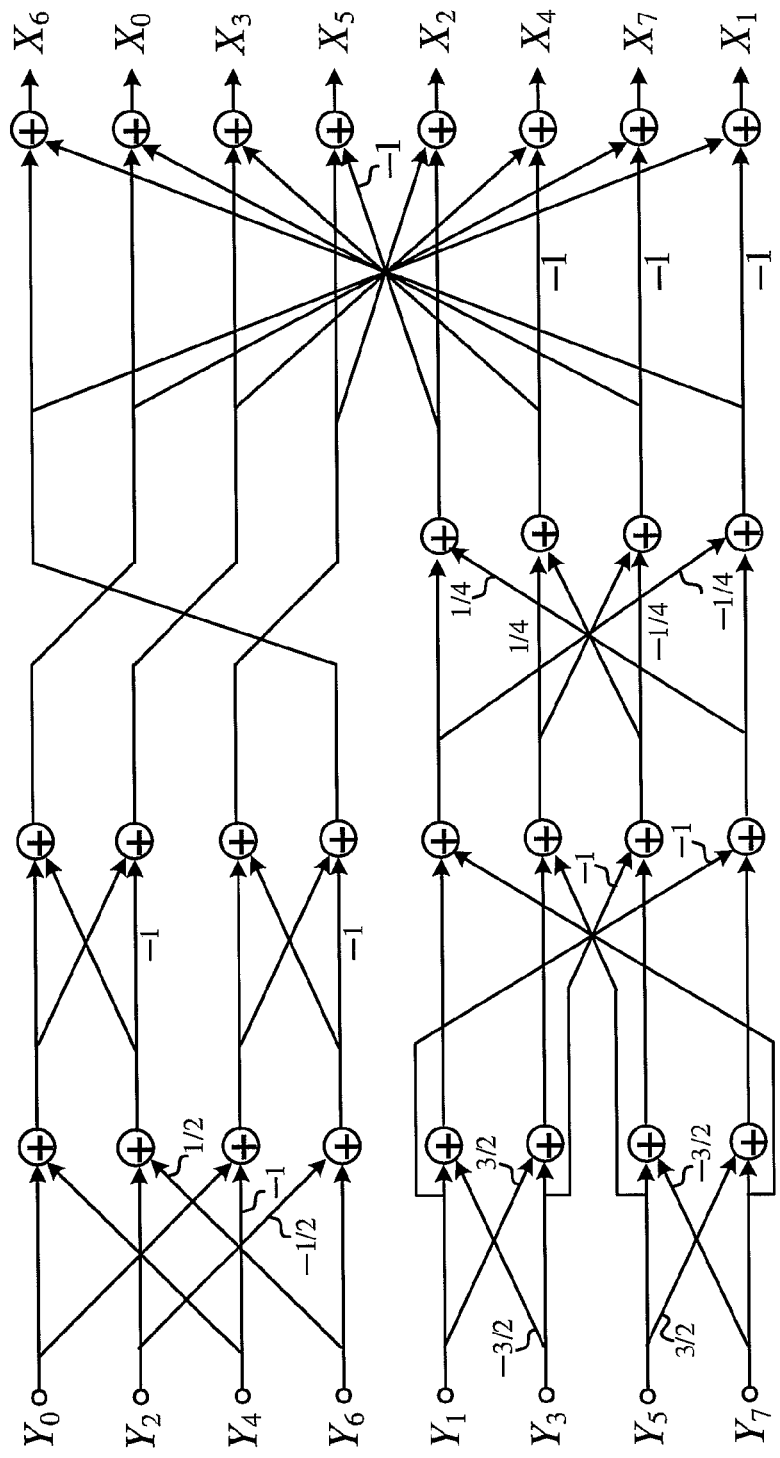
Figure 8B:
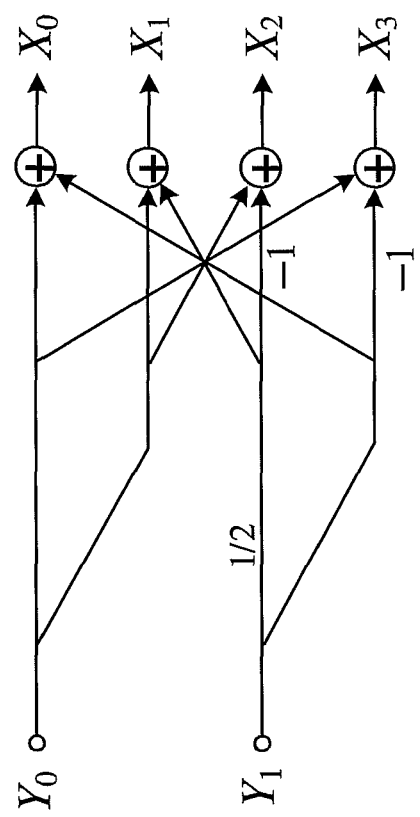
Figure 8C:
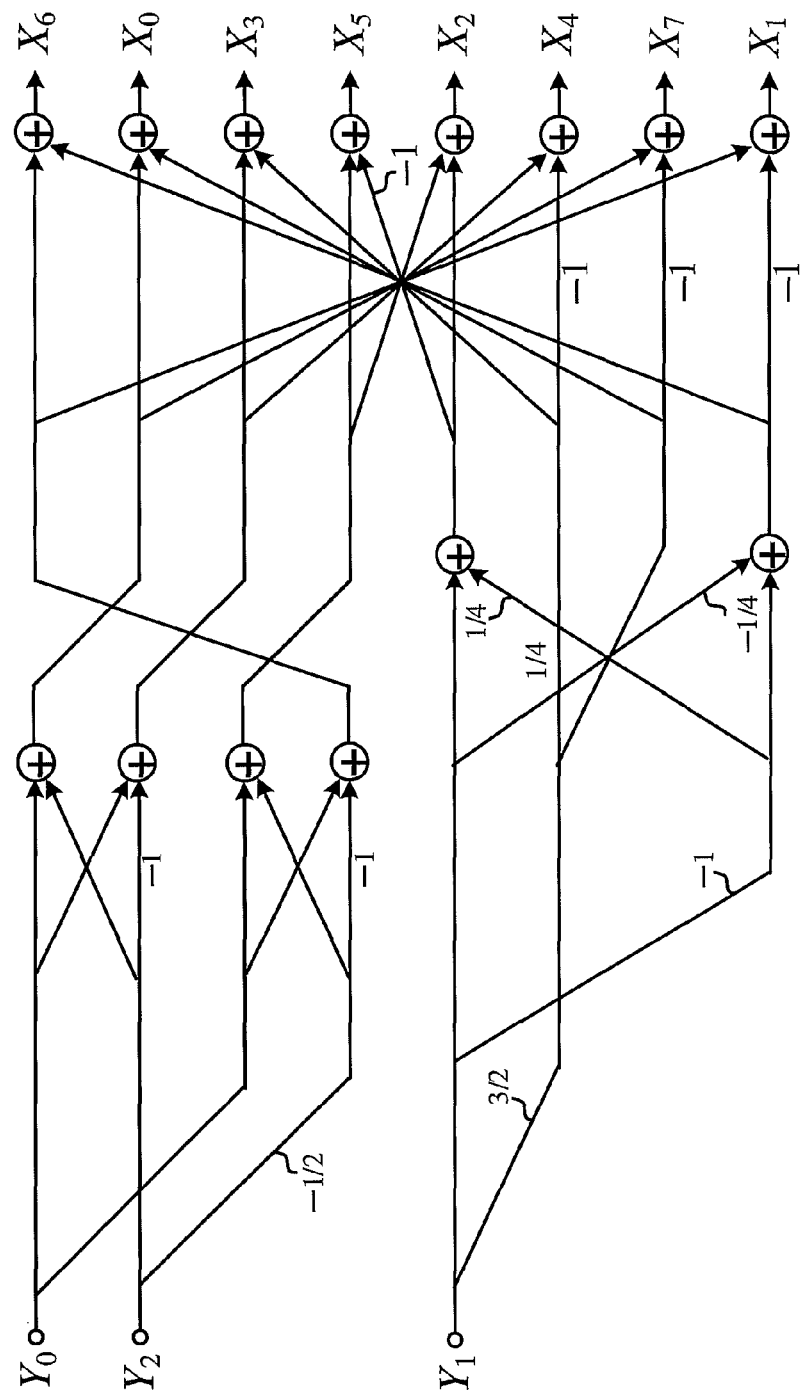

FIG. 8b shows a 1-D inverse integer transform topology having 2 inputs and 4 outputs and requiring only 1 shift operation and 4 addition operations, and its computational complexity is reduced significantly as compared with the 1-D inverse integer transform topology having 4 inputs and 4 outputs and requiring two shift operations and 8 addition operations as shown in FIG. 1b. Similarly, FIG. 8c shows a 1-D inverse integer transform topology having 3 inputs and 8 outputs and requiring only 5 shift operations and 15 addition operations, and its computational complexity is reduced significantly as compared with the 1-D inverse integer transform topology having 8 inputs and 8 outputs and requiring 10 shift operations and 32 addition operations as shown in FIG. 1c. In the following, Tables 3 and 4 list respectively the computational complexities of 1-D inverse integer transforms based on different number of inputs for N equaling to 4 and 8, wherein, S represents the number of shift operations. From the values in the Tables it can be known that, the larger the value of i, the higher the computational complexity. Through the application of the present invention, a 2-D inverse transform having the minimum computational complexity can be obtained through utilizing simplified 1-D inverse transforms in cooperation with the determination of the EOB point, corner coefficients, and optimized operation mode. In addition, Table 1 exhibits the computational complexity of a 2-D inverse integer transform for N=4.

TABLE 3

Computational complexity of 1-D inverse integer transforms having i inputs and 4 outputs.

| Number of inputs (i) | 1 | 2 | 3 | 4 |
|---|---|---|---|---|
| Number of shift operations (S) | 0 | 1 | 1 | 2 |
| Number of addition operation (A) | 0 | 4 | 6 | 8 |
| Number of total operations (S + A) | 0 | 5 | 7 | 10 |

TABLE 4

Computational complexity of 1-D inverse integer transforms for i inputs and 8 outputs

| Number of inputs (i) | 1 | 2 | 3 | 4 | 5 | 6 | 7 | 8 |
|---|---|---|---|---|---|---|---|---|
| Number of shift operations (S) | 0 | 4 | 5 | 7 | 7 | 8 | 9 | 10 |
| Number of addition operations (A) | 0 | 11 | 15 | 20 | 22 | 26 | 28 | 32 |
| Number of total operations (S + A) | 0 | 15 | 20 | 27 | 29 | 34 | 37 | 42 |

In the following, the EOB point of 8 is taken as an example for explanation, at this time a and b are 3 and 4 respectively, suppose that the coefficients at bottom-left and top-right corners are not zero, and according to the method of the present invention, it must first execute $\overline{Y_{3 \times 4}} = Y_{3 \times 4} \times D_{4 \times 4}$ then it executes $D_{4 \times 3}{}^T \times \overline{Y_{3 \times 4}}$. According to Table 3, $\overline{Y_{3 \times 4}} = Y_{3 \times 4} \times D_{4 \times 4}$ requires three 1-D inverse integer transforms in which one each has 4 inputs and 4 outputs, 3 inputs and 4 outputs, and 1 input and 4 outputs, with its computational complexity 3S+14A. Moreover, $X_{4 \times 4} = D_{4 \times 3}{}^T \times \overline{T_{3 \times 4}}$ requires four 1-D inverse integer transforms, each having 3 inputs and 4 outputs, with its computational complexity 4S+24A, such that the total computational complexity of the 2-D inverse integer transform is 7S+38A. On the contrary, in case that it first executes $\overline{Y_{4 \times 4}} = D_{4 \times 3}{}^T \times Y_{3 \times 4}$, and then executes $X_{4 \times 4} = \overline{Y_{4 \times 4}} D_{4 \times 4}$, then the total computational complexity of the 2-D inverse integer transform is 11S+46A, and that would cost 57.1□ more shift operations and 21.1□ more addition operations than if it first executes $\overline{Y_{3 \times 4}} = Y_{3 \times 4} \times D_{4 \times 4}$.

On the other hand, in case that the corner coefficient is zero, that would lead to one of the following three consequences: (a) only the bottom-left corner coefficient Y(3,1) is zero, then total computational complexity is 7S+30A; (b) only the top-right corner coefficient Y(1,4) is zero, then total computational complexity is 6S+36A; and (c) both the bottom-left and top-right corner coefficients are zeros, then total computational complexity is 6S+28A. From the above description it can be known that, the elimination of computations of zero-value corner coefficients can reduce the total computational complexity of a related transform.

Summing up the above, the low-complexity inverse transform computation method of the present invention is used to perform an inverse transform of coefficients between a frequency domain and a spatial domain during data decompression process, to reduce its computational complexity, so that the decoding system is able to perform inverse transforms more efficiently. The present invention can be applied to the decompression process of video or still image, while preserving its picture quality. Moreover, information about the EOB point in a block is used to determine the coefficient distribution in a block, thus reducing the size of the computation matrix and computational complexity as well as a high likelihood of zero-value corner coefficients. In addition, an adequate operation mode is determined, in finally realizing a 2-D inverse transform through the simplified 1-D inverse transforms, hereby achieving computational complexity much lower than that of the conventional inverse transform.

The above detailed description of the preferred embodiment is intended to describe more clearly the characteristics and spirit of the present invention. However, the preferred embodiments disclosed above are not intended to be any restrictions to the scope of the present invention. Conversely, its purpose is to include the various changes and equivalent arrangements which are within the scope of the appended claims.

What is claimed is:

1. A non-transitory computer readable medium including a computer-executable program that, when executed by a computer, performs a low-complexity inverse transform computation method, the method comprising following steps:

analyzing a block, which includes a matrix formed by a plurality of coefficients, and obtaining an end-of-block (EOB) point in said coefficients of said matrix;

determining if at least a corner coefficient before said EOB point is zero, and if it is zero, reducing size of said matrix;

determining an operation mode based on said EOB point and said corner coefficient(s); and simplifying 1-D inverse transforms of said matrix in realizing its 2-D inverse transform, wherein a way of determining said corner coefficients is classified into a bottom-left corner way and a top-right corner way, and they are further classified into not requiring to determine said corner coefficients, requiring only to determine the bottom-left corner coefficient, requiring only to determine the top-right corner coefficient, or requiring to determine both said bottom-left and said top-right corner coefficients.

2. The non-transitory computer readable medium as claimed in claim 1, wherein said 1-D inverse transforms and said 2-D inverse transform are inverse discrete cosine transform, inverse integer transform, inverse discrete Fourier transform, inverse discrete sine transform, or inverse discrete wavelet transform.

3. The non-transitory computer readable medium as claimed in claim 1, wherein said operation mode relates to dimension of said matrix and computation order.

4. The non-transitory computer readable medium as claimed in claim 1, wherein said computation order is classified into a row-after-column manner or a column-after-row manner.

5. The non-transitory computer readable medium as claimed in claim 1, wherein when said coefficient is outside an effective dimension range of said matrix, said coefficient is zero, and no operation is performed thereon.

6. The non-transitory computer readable medium as claimed in claim 1, wherein a way of determining said operation mode is classified into a before-determining-said-corner-coefficient way and an after-determining-said-corner-coefficient way, said before-determining-said-corner-coefficient way is used to obtain a simplified matrix taking into consideration of said EOB point, while said after-determining-said-corner-coefficient way is used to obtain a simplified matrix taking into consideration of said EOB point and said corner coefficient(s).

7. The non-transitory computer readable medium as claimed in claim 1, wherein said 1-D inverse transform is performed on said matrix to simplify it into said matrix having the number of its inputs less than or equal to the number of its outputs.

8. The non-transitory computer readable medium as claimed in claim 1, wherein said 2-D inverse transform is realized through said simplified 1-D inverse transforms in cooperation with said EOB point, said corner coefficient(s), and said operation mode.

9. The non-transitory computer readable medium as claimed in claim 1, wherein said EOB point is obtained directly from parameters in a bit stream or through performing calculations on said parameters.

* * * * *